(12) United States Patent
Lee et al.

(10) Patent No.: US 10,049,559 B2
(45) Date of Patent: Aug. 14, 2018

(54) POWER SAVING SAFETY HELMET CAPABLE OF WIRELESS COMMUNICATION, AND WIRELESS TRANSMISSION AND RECEPTION METHOD THEREFOR

(71) Applicant: KMW INC., Hwaseong, Gyeonggi-do (KR)

(72) Inventors: Yoon-Bae Lee, Gyeonggi-do (KR); Jae-Won Lee, Gyeonggi-do (KR); Young-Uk Son, Gyeonggi-do (KR); Ji-Man Kim, Gyeonggi-do (KR); Jae-Soon Kang, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 0 days.

(21) Appl. No.: 15/415,275

(22) Filed: Jan. 25, 2017

(65) Prior Publication Data
US 2017/0132907 A1    May 11, 2017

Related U.S. Application Data

(63) Continuation of application No. PCT/KR2015/007752, filed on Jul. 24, 2015.

(30) Foreign Application Priority Data

Jul. 25, 2014    (KR) .................. 10-2014-0094918

(51) Int. Cl.
*H04M 11/04* (2006.01)
*G08B 25/01* (2006.01)
(Continued)

(52) U.S. Cl.
CPC ........... *G08B 25/016* (2013.01); *G08B 25/10* (2013.01); *H04W 4/008* (2013.01); *H04W 4/10* (2013.01);
(Continued)

(58) Field of Classification Search
CPC ...... G08B 25/016; H04W 4/008; H04W 4/10; H04W 4/22; H04W 52/0209; H04W 88/02
(Continued)

(56) References Cited

U.S. PATENT DOCUMENTS 8,644,792 B2 *    2/2014    Lontka ..................... G08B 7/06
340/506
8,897,237 B2 *    11/2014    Cui .................. H04W 72/1247
370/313
(Continued)

FOREIGN PATENT DOCUMENTS

CN    201585466 U    9/2010
JP    H01145579 A    6/1989
(Continued)

OTHER PUBLICATIONS

Lee et al., "Apparatus for preventing collision in safety cap", 2014-01016, machine translation of KR20140006663(A) in PDF format, pp. 1-8.*
(Continued)

*Primary Examiner* — Sonny Trinh
(74) *Attorney, Agent, or Firm* — Mintz Levin Cohn Ferris Glovsky and Popeo, P.C.; Kongsik Kim

(57) ABSTRACT

The present invention relates to a power saving safety helmet capable of wireless communication, and a wireless transmission and reception method therefor, and the power saving safety helmet capable of wireless communication comprises: a voice input unit for receiving a voice input from a user; a sensor unit sensing whether an accident involving the user has occurred so as to generate an accident sensing signal; a wireless communication unit for intermittently transmitting and receiving, by using frequency channels different from each other, a voice signal and an emergency signal generated by the voice and the accident sensing (Continued)

signal or transmitted from the outside; a sound output unit for outputting a voice and a beep sound corresponding to the voice signal and the emergency signal transmitted from the outside; and a control unit for controlling the beep sound so as to be outputted at output time intervals which are set to be different according to the reception strength of the received emergency signal.

15 Claims, 11 Drawing Sheets

(51) Int. Cl.
    *H04W 4/10*     (2009.01)
    *H04W 4/00*     (2018.01)
    *H04W 52/02*     (2009.01)
    *G08B 25/10*     (2006.01)
    *H04W 4/80*     (2018.01)
    *H04W 4/22*     (2009.01)
    *H04W 4/90*     (2018.01)

(52) U.S. Cl.
    CPC .......... *H04W 4/80* (2018.02); *H04W 52/0209* (2013.01); *H04W 4/22* (2013.01); *H04W 4/90* (2018.02)

(58) Field of Classification Search
    USPC .......... 455/404.1, 404.2, 41.2, 518, 519, 521
    See application file for complete search history.

(56) References Cited

U.S. PATENT DOCUMENTS

2005/0172959 A1    8/2005    Williams

2009/0052714 A1*    2/2009    Wilbur .................. H04B 1/385
                                                                         381/364
2014/0189937 A1    7/2014    Pietrzak et al.

FOREIGN PATENT DOCUMENTS

| | | |
|---|---|---|
| JP | H11250372 A | 9/1999 |
| JP | 2014127873 A | 7/2014 |
| KR | 10-0658021 B1 | 12/2006 |
| KR | 10-2010-0005968 A | 1/2010 |
| KR | 10-2013-0021060 A | 3/2013 |
| KR | 10-2013-0138049 A | 12/2013 |
| KR | 10-2014-0006663 A | 1/2014 |
| WO | 2014074692 A1 | 5/2014 |

OTHER PUBLICATIONS

Kwon, Yon Sang, "Apparatus and method for changing transmitting frequency of a wireless set", Dec. 8, 2006, machine translation of KR100658021 (B1), pp. 1-7.*
Park et al., "Removable smart module for helmet"; Mar. 5, 2013, machine translation of KR20130021060 (A), pp. 1-8.*
International Search Report for International Application No. PCT/KR2015/007752, dated Oct. 21, 2015, English translation, 5 pages.
Written Opinion for International Application No. PCT/KR2015/007752, dated Oct. 21, 2015, English transation, 22 pages.
"Site Visualization" Total Solution with the use of Mobile Server, Micro Mobile Server, Business Communication, Business Communication Co., Ltd., Dec. 1, 2008, 45th volume, No. 12, p. 108 to 110.
Japanese Office Action in corresponding Japanese Application No. 2017504149, dated Jan. 23, 2018, English translation, 8 pages.
Extended European Search Report for EP Application No. 15824393.1, dated May 4, 2018, 15 pages.

* cited by examiner

POWER SAVING SAFETY HELMET CAPABLE OF WIRELESS COMMUNICATION, AND WIRELESS TRANSMISSION AND RECEPTION METHOD THEREFOR

CROSS-REFERENCE TO RELATED APPLICATIONS

This application is a continuation application of International Application No. PCT/KR2015/007752 filed on Jul. 24, 2015, which claims priority to Korean Application No. 10-2014-0094918 filed on Jul. 25, 2014, which applications are incorporated herein by reference.

TECHNICAL FIELD

The present disclosure relates to a power-saving safety helmet capable of wireless communication and a wireless transmission and reception method therefor, and more particularly, to a power-saving safety helmet capable of wireless communication, for intermittently transmitting or receiving a voice signal and an emergency signal on different frequency channels and determining the position of a transmitting user through a beep sound output at an interval set according to the Received Signal Strength Indicator (RSSI) of the emergency signal, and a wireless transmission and reception method therefor.

BACKGROUND ART

As industrial sites such as construction sites, dockyards, and machine factories, or disaster sites have recently become huge and complex in view of the development of industrial technology, it is essential that users carry communication equipment for communication to cooperate with a control center or other users as well as wear protective gears such as helmets, belts, and gloves to ensure the safety of the users and increase the skills and efficiency of tasks.

For this purpose, conventionally, a protective gear such as a helmet is combined with communication equipment like a radio, and a user can wirelessly communicate with another user by means of the radio or the like, while wearing the protective gear.

However, the conventional radio is confined to simple voice transmission and reception between a transmitter and a receiver. Thus, additional communication equipment such as a Global Positioning System (GPS) module and a Bluetooth module is needed to track down an accident victim and thus rapidly rescue the victim. Besides, if the position of a victim is determined through a Base Station (BS)-based GPS module, the GPS module may have a big error regarding the position of the victim due to a topography or the geographical features of an accident scene.

Accordingly, there is a pressing need for an apparatus and method for transmitting and receiving an emergency signal, upon occurrence of an accident, as well as a voice signal through a radio, without the need for additional communication equipment.

SUMMARY

An object of the present disclosure is to provide a power-saving safety helmet capable of wireless communication, for transmitting and receiving a voice signal and an emergency signal on different frequency channels without an additional communication module, and a wireless transmission and reception method therefor.

Another object of the present disclosure is to provide a power-saving safety helmet capable of wireless communication, for reducing power consumption by alternating between a transmission/reception mode and a standby mode during transmission and reception of an emergency signal, and a wireless transmission and reception method therefor.

Another object of the present disclosure is to provide a power-saving safety helmet capable of wireless communication, for determining the position of a transmitting user through a beep sound output at an interval set according to the Received Signal Strength Indicator (RSSI) of an emergency signal, and a wireless transmission and reception method therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, a power-saving safety helmet capable of wireless communication includes a voice input unit for receiving a voice from a user, a sensor unit for generating an accident sensing signal by sensing whether an accident has occurred to the user, a wireless communication unit for intermittently transmitting or receiving a voice signal and an emergency signal on different frequency channels, the voice signal and the emergency signal being generated based on the voice and the accident sensing signal or transmitted from the outside, a sound output unit for outputting a voice and a beep sound corresponding to the voice signal and the emergency signal received from the outside, and a controller for controlling output of the beep sound at an output interval set according to a reception strength (Received Signal Strength Indicator (RSSI)) of the received emergency signal.

In another aspect of the present disclosure, a wireless transmission method in a power-saving safety helmet capable of wireless communication includes determining whether a Push-To-Talk (PTT) signal or an accident sensing signal has been received by a controller, upon receipt of the PTT signal, receiving a voice, generating a voice signal, and transmitting the voice signal on a first frequency channel by the controller, and upon receipt of the accident sensing signal, generating an emergency signal and intermittently transmitting the emergency signal on a second frequency channel by the controller.

In the aspect of the present disclosure, a wireless reception method in a power-saving safety helmet capable of wireless communication includes intermittently monitoring reception of a voice signal and an emergency signal by repeating one cycle of a standby mode, a voice signal reception mode, the standby mode, and an emergency signal reception mode through a reception module of a wireless communication unit according to set time periods by a controller, monitoring the voice signal by setting the reception module to a first frequency channel in the voice signal reception mode by the controller, and monitoring the emergency signal by setting the reception module to a second frequency channel in the emergency signal reception mode by the controller.

Details of other embodiments lie in the detailed description of the present disclosure and the attached drawings.

According to the present disclosure, since a helmet can transmit or receive a voice signal and an emergency signal on different frequency channels without an additional communication module, the structure of the helmet can be simplified.

When the emergency signal is transmitted or received, the helmet intermittently transmits or receives the emergency signal by alternating between a transmission/reception mode and a transmission/reception standby mode, thereby reducing power consumption.

Further, because a safety helmet of a rescuer receives an emergency signal from a safety helmet of a victim and outputs beep sound at a time interval determined based on the RSSI of the received emergency signal, the rescuer can track down the position of the victim according to the beep sound interval.

Figure 2:
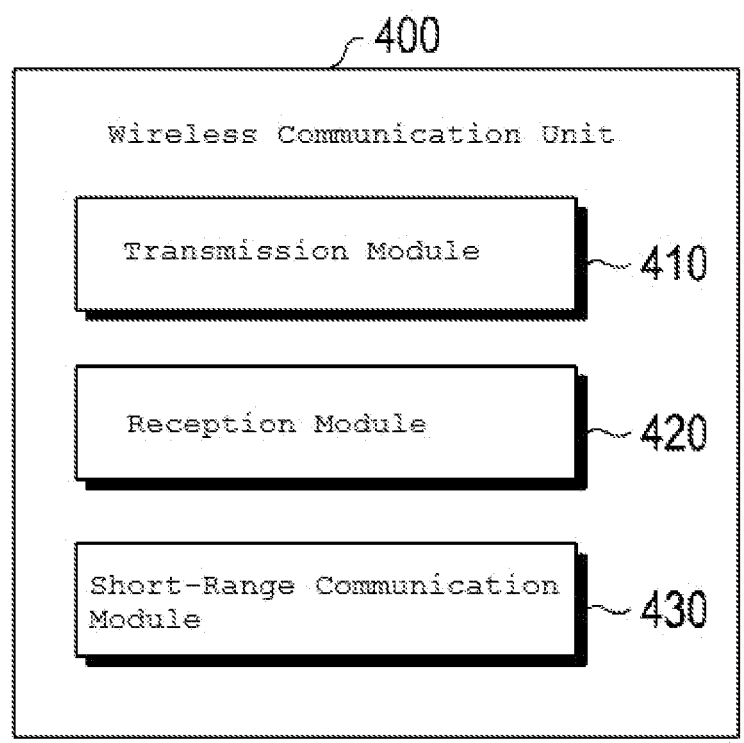
FIG. 2 is a block diagram of a wireless communication unit illustrated in FIG. 1.
Figure 3:
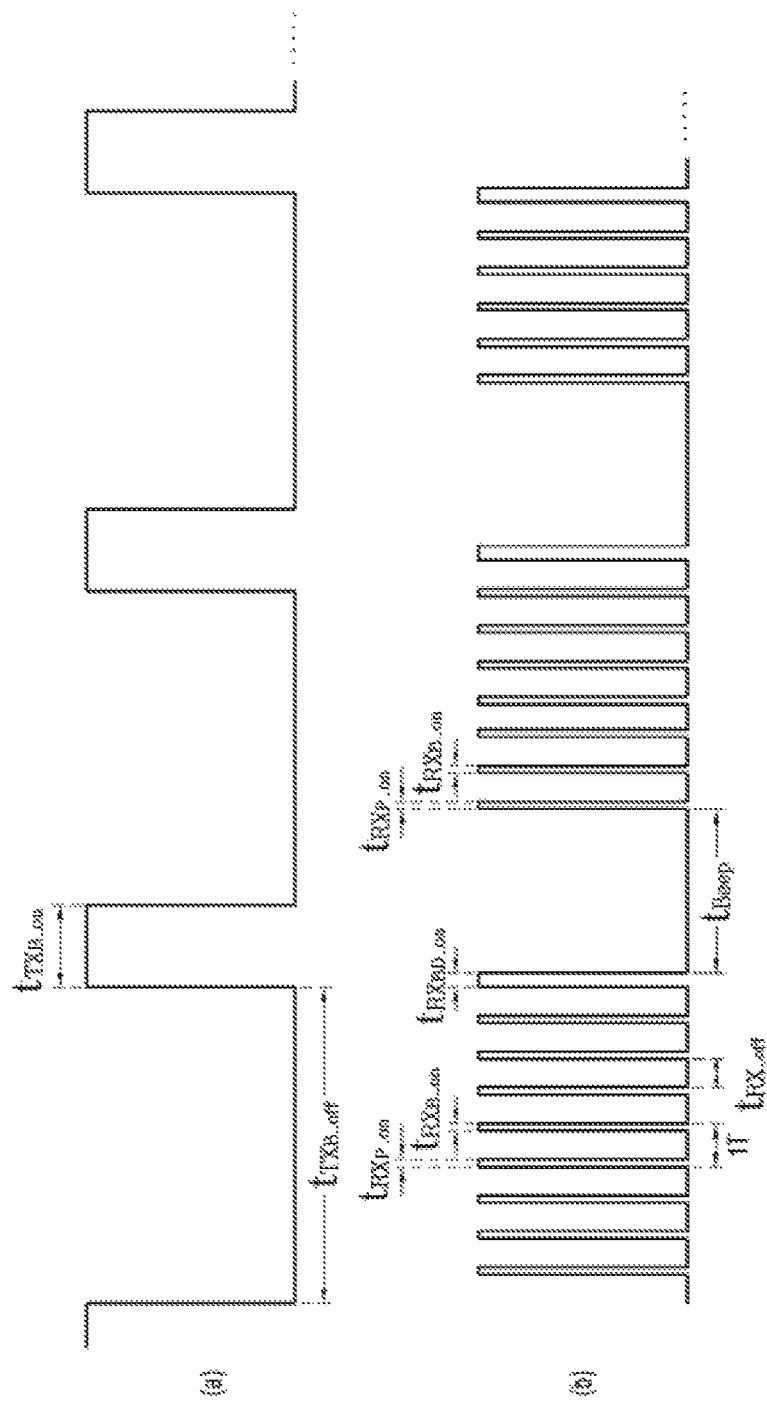

(a) of FIG. 3 is a transmission timing diagram of a transmission module illustrated in FIG. 2, and (b) of FIG. 3 is a reception timing diagram of a reception module illustrated in FIG. 2.

Figure 1:
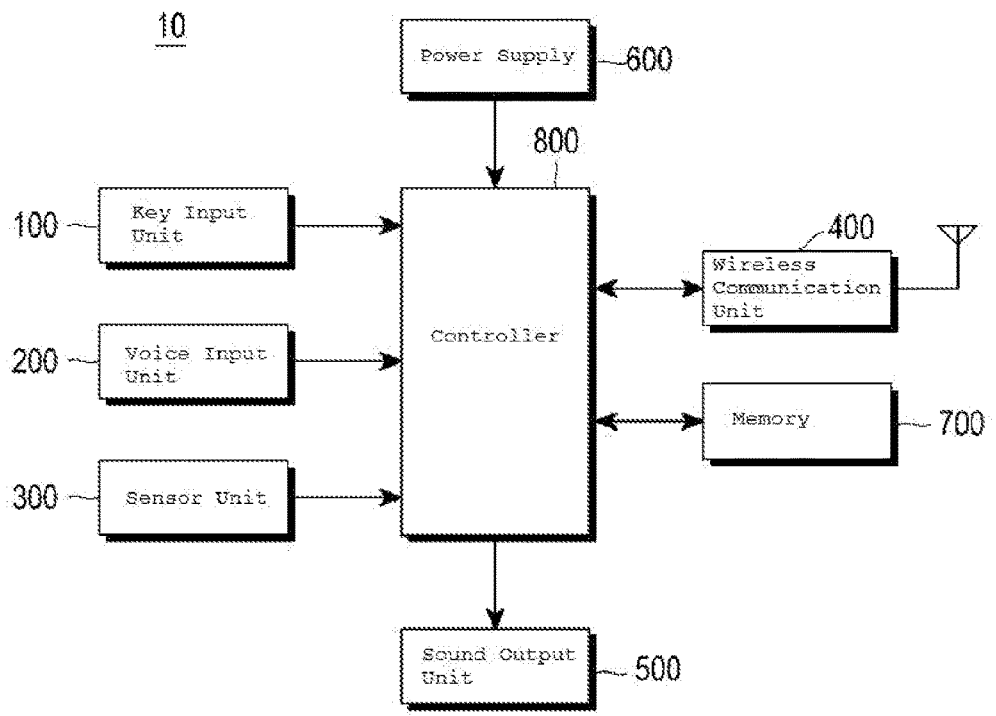
FIG. 1 is a block diagram of a power-saving safety helmet capable of wireless communication according to an embodiment of the present disclosure.
Figure 4:
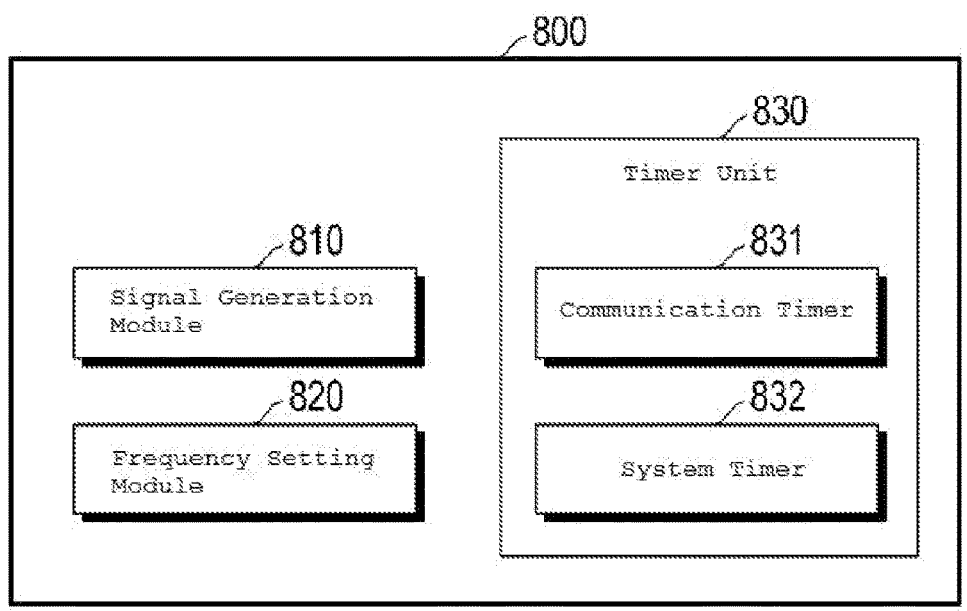

FIG. 4 is a block diagram of a controller illustrated in FIG. 1.

Figure 5:
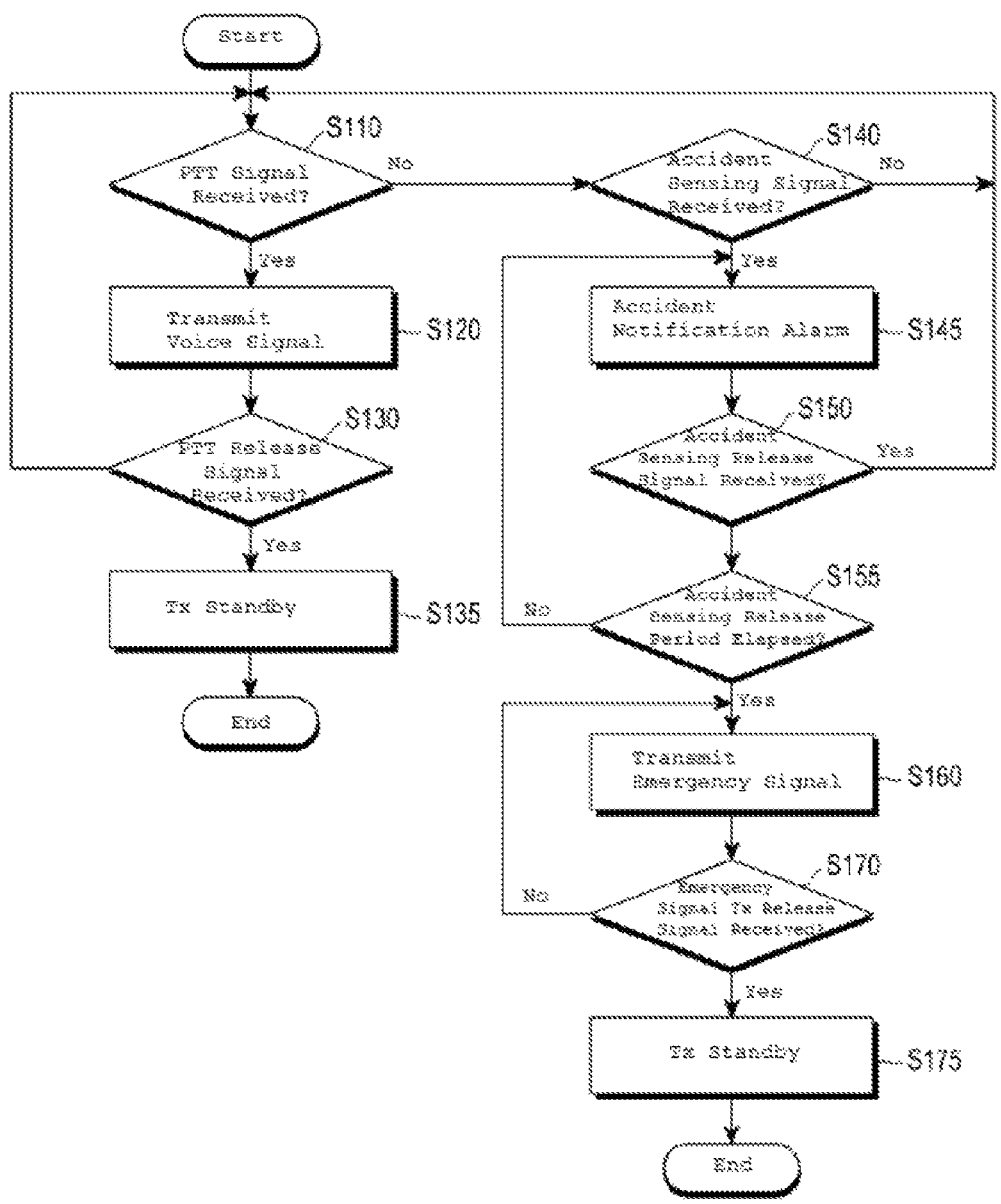

FIG. 5 is a flowchart illustrating a wireless transmission method in the power-saving safety helmet capable of wireless communication according to an embodiment of the present disclosure.

Figure 6:
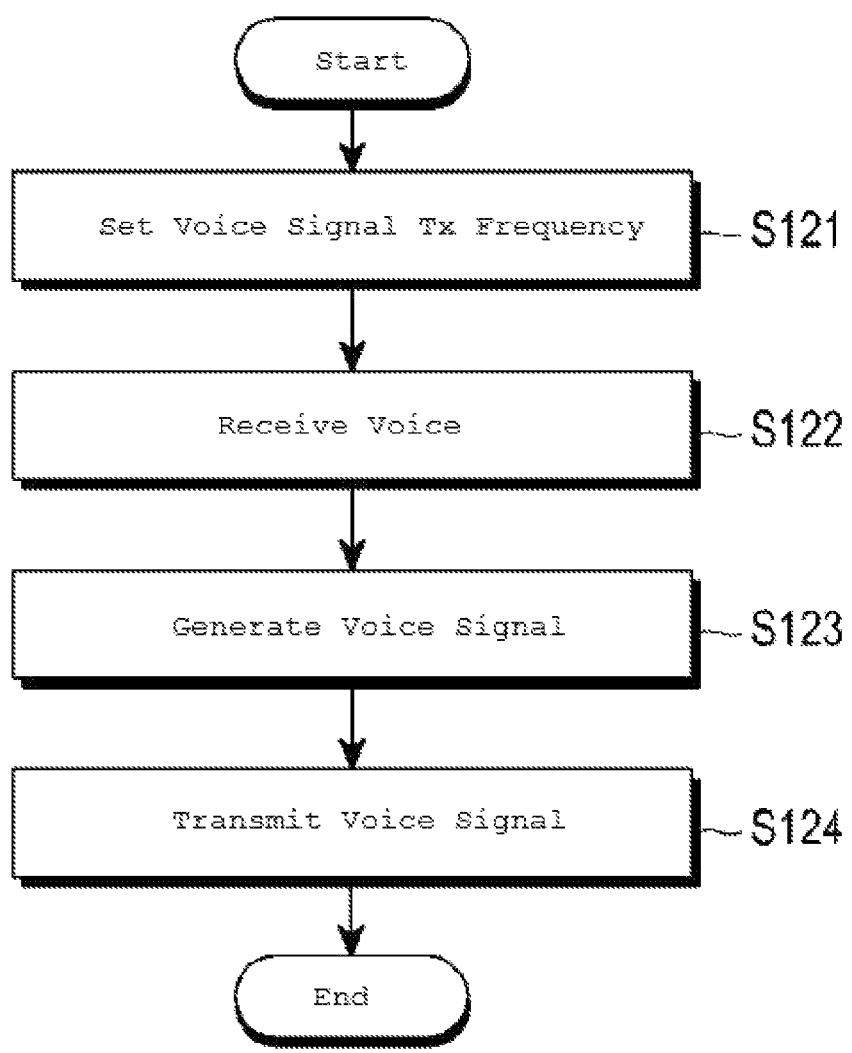

FIG. 6 is a flowchart illustrating a voice signal transmission method illustrated in FIG. 5.

Figure 7:
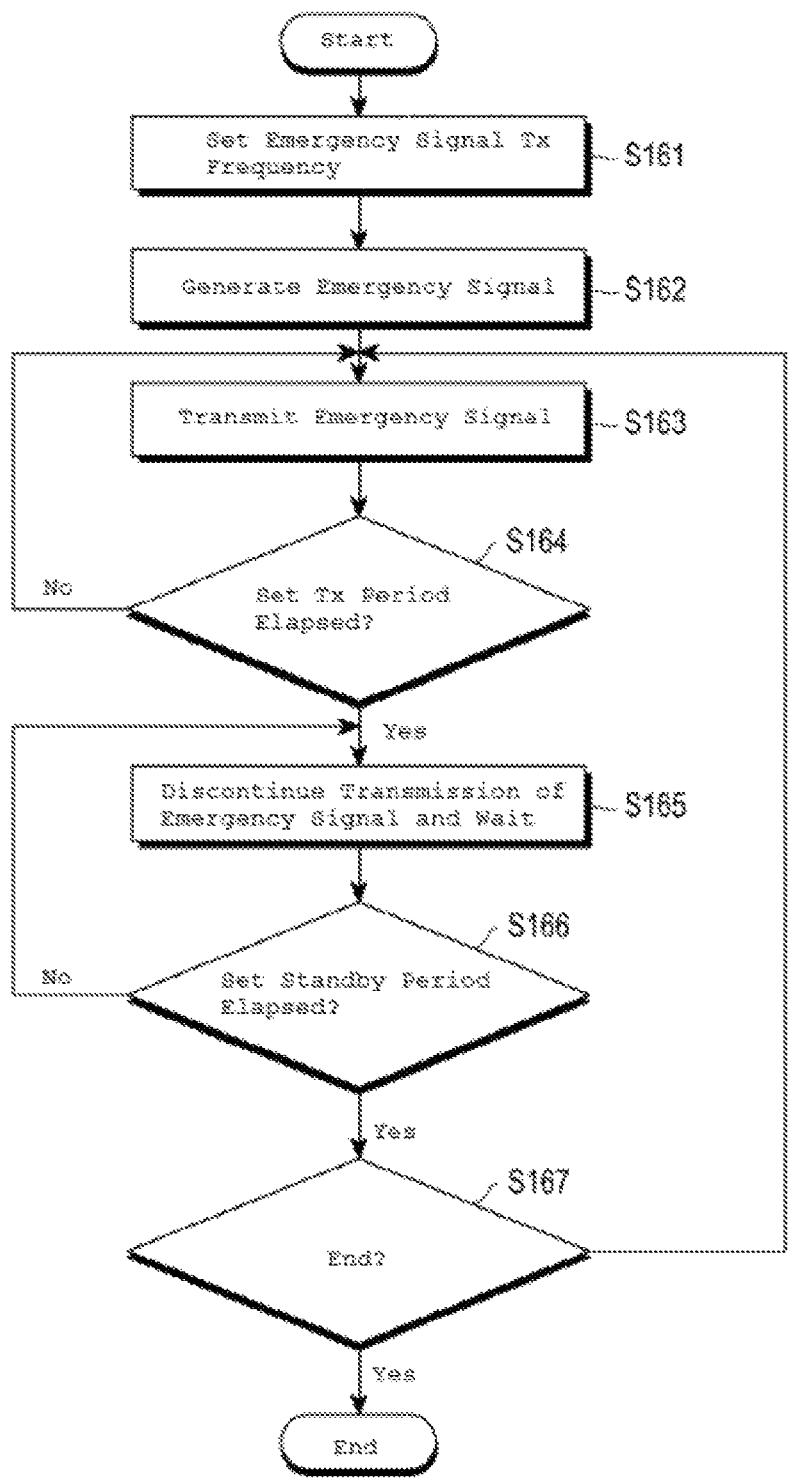

FIG. 7 is a flowchart illustrating an emergency signal transmission method illustrated in FIG. 5.

Figure 8:
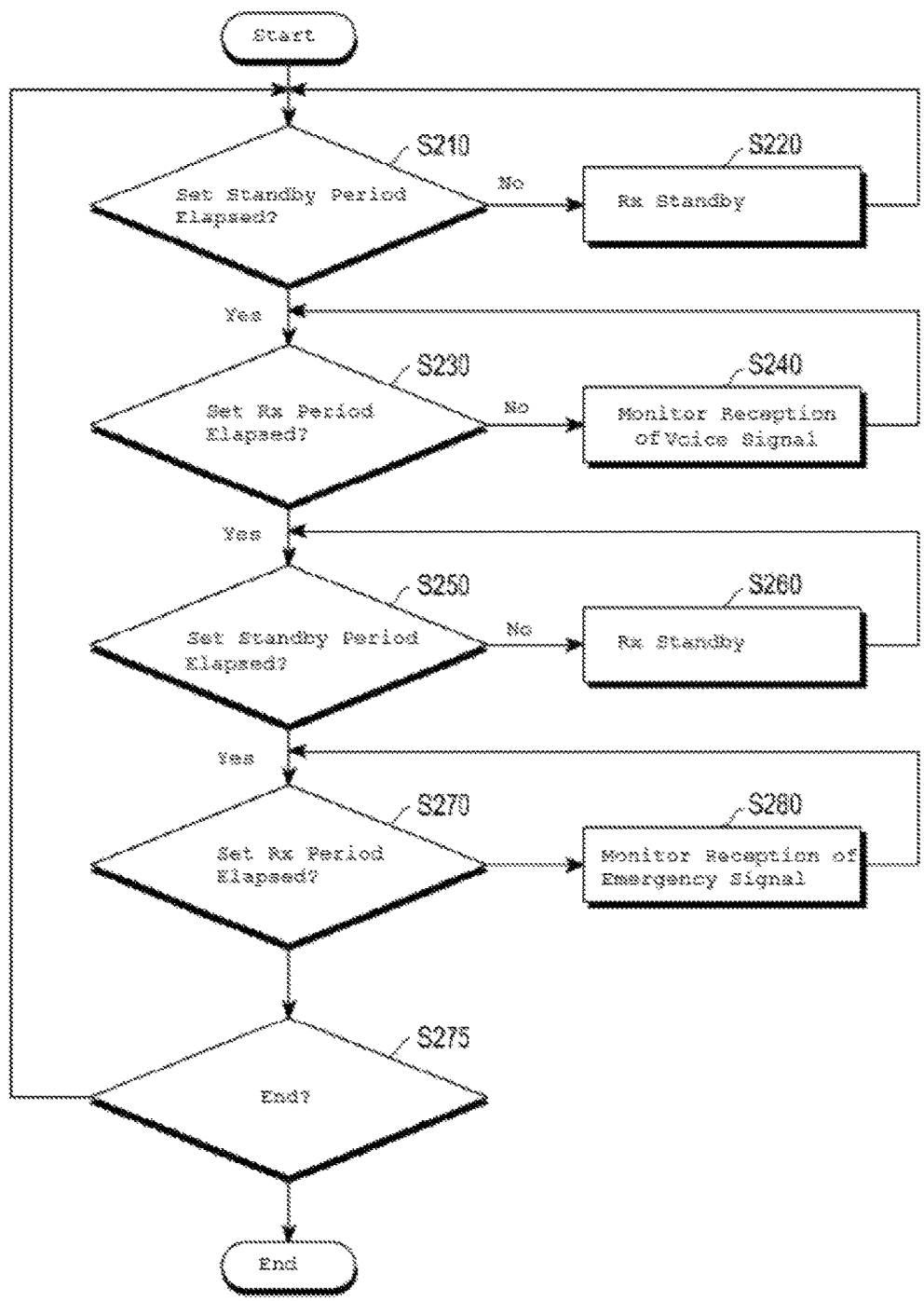

FIG. 8 is a flowchart illustrating a wireless reception method in the power-saving safety helmet capable of wireless communication according to an embodiment of the present disclosure.

Figure 9:
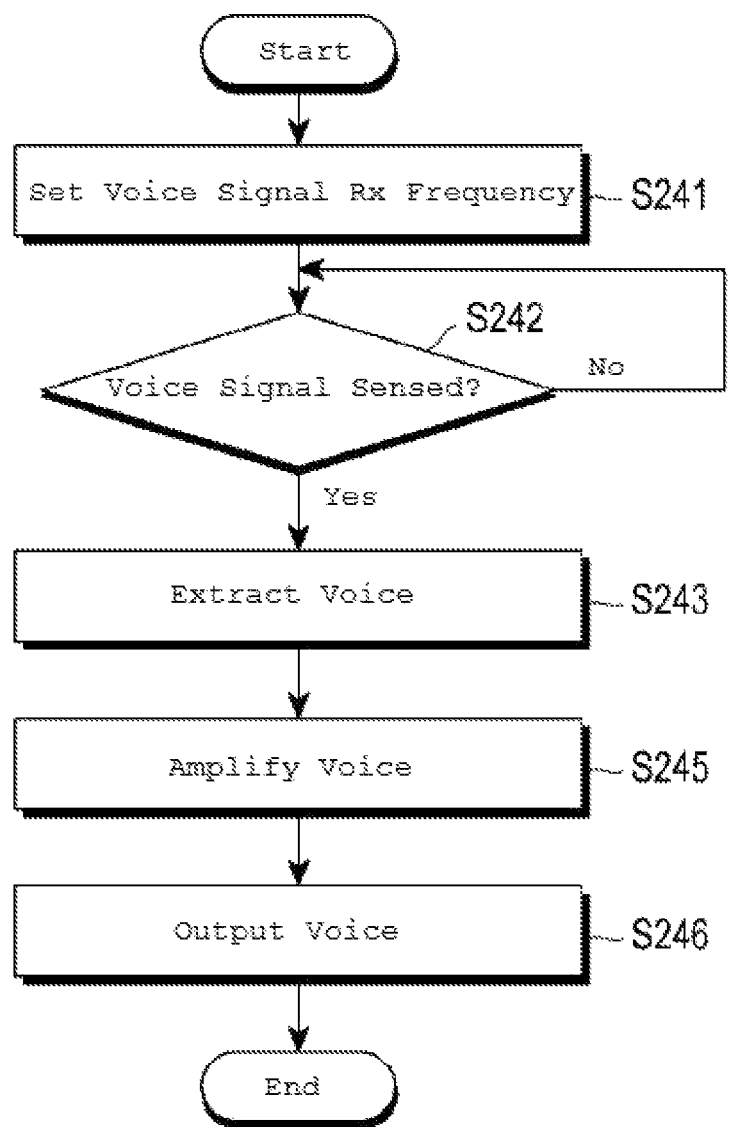

FIG. 9 is a flowchart illustrating a voice signal reception method illustrated in FIG. 8.

Figure 10:
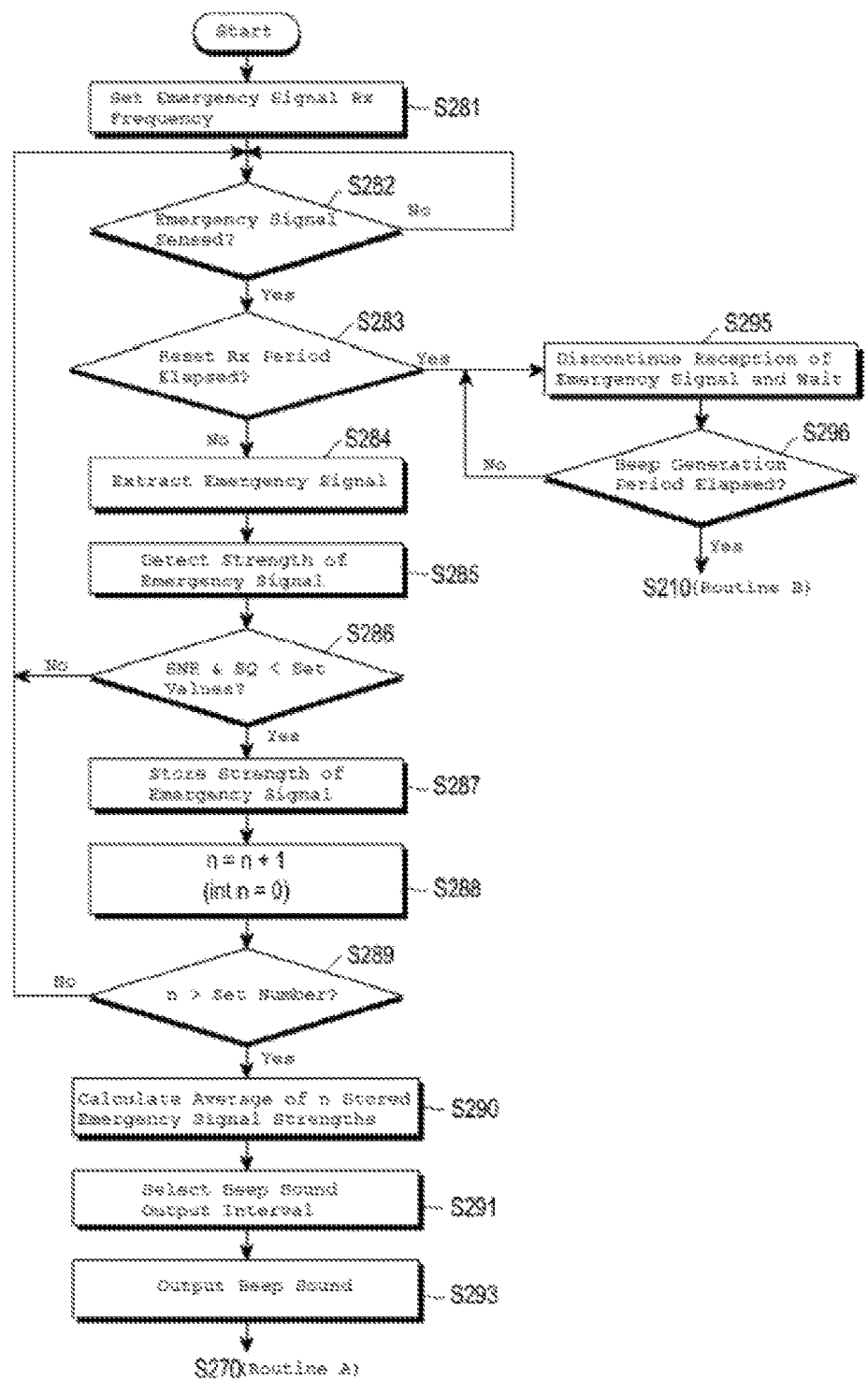

FIG. 10 is a flowchart illustrating an emergency signal reception method illustrated in FIG. 8.

Figure 11:
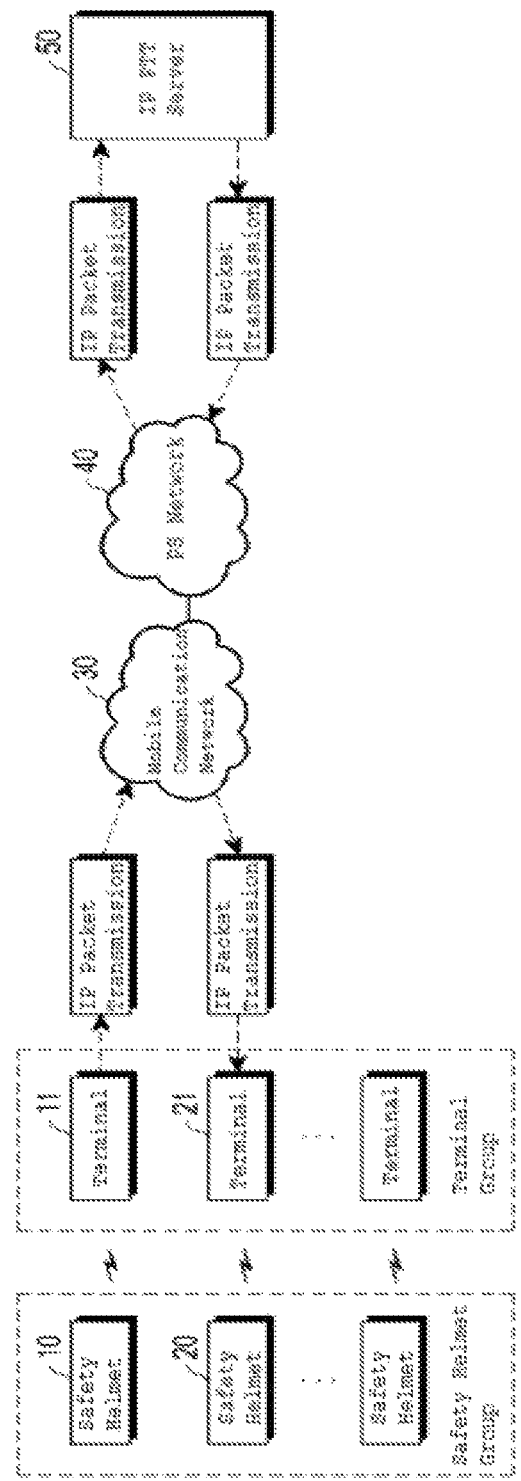

FIG. 11 is a view illustrating a configuration of an Internet Protocol (IP) Push-To-Talk (PTT) communication network using the power-saving safety helmet capable of wireless communication according to an embodiment of the present disclosure.

DETAILED DESCRIPTION

Objects, advantages, and technical structures for achieving them will become apparent upon examination of the following detailed description of embodiments of the present disclosure as well as the attached drawings. However, the present disclosure is not limited to the disclosed embodiments. Rather, the present disclosure may be implemented in various other ways. The embodiments are provided to make the disclosure of the present disclosure comprehensive and help those skilled in the art to comprehensively understand the scope of the present disclosure, and the present disclosure is defined only by the appended claims.

In the description of the present disclosure, like reference numerals denote the same components. Accordingly, even though the same or similar reference numerals are not mentioned or described in corresponding drawings, they may be described with reference to other drawings. Further, even though a reference numeral is not indicated in one drawing, it may be described with reference to another drawing.

FIG. 1 is a block diagram of a power-saving safety helmet 10 capable of wireless communication according to an embodiment of the present disclosure. Referring to FIG. 1, the power-saving safety helmet 10 capable of wireless communication according to the embodiment of the present disclosure may include a key input unit 100, a voice input unit 200, a sensor unit 300, a wireless communication unit 400, a sound output unit 500, a power supply 600, a memory 700, and a controller 800.

The key input unit 100 may include, for example, a Push-To-Talk (PTT) input key, an alarm release key, and an emergency signal Transmission (Tx) release key. The PTT input key may be used to transmit or receive a voice signal. The PTT input key, which is a key for switching between Tx and Reception (Rx) modes of a voice signal, may have a toggling function. For example, if the PTT input key is pressed, a PTT signal is generated and thus the voice signal Tx mode is transitioned to, for transmitting a voice signal. On the other hand, if the PTT input key is released, a PTT release signal is generated and thus the voice signal Rx mode may be switched to, for receiving a voice signal.

The alarm release key is used to release an accident alarm. If the alarm release key is pressed, an accident sensing release signal may be generated and thus an accident alarm may be released. For example, when a user wants to release a wrong accident alarm invoked by a device failure, the alarm release key may be used.

The emergency signal Tx release key is used to release emergency signal transmission. The emergency signal transmission may be released by pressing the emergency signal Tx release key. For example, when a rescue is completed after an accident occurs and thus emergency signal transmission is to be released, the emergency signal Tx release key may be used.

The voice input unit 200 may receive a voice from the user. The controller 800 may convert the voice received through the voice input unit 200 to a voice signal being an electrical signal. The voice signal may be transmitted through the wireless communication unit 400. For example, the voice input unit 200 may include a microphone.

The sensor unit 300 may generate an accident sensing signal by sensing the user's motion or a shock imposed on the user. The controller 800 may receive the accident sensing signal, and if the value of the accident sensing signal is equal to or larger than a set value, the controller 800 may generate an emergency signal. The emergency signal may be transmitted through the wireless communication unit 400.

The sensor unit 300 may include, for example, any of a tilt sensor, a shock sensor, a gyro sensor, and a combination of one or more of the sensors. The tilt sensor may sense the user's fall or long stationary state. The shock sensor may sense a collision to or a fall onto the user. The gyro sensor, which is an angular velocity sensor, may generate an electrical signal from which a corresponding direction may be determined according to a movement. The sensor unit 300 may be installed on an outer or inner surface of the power-saving safety helmet 10 capable of wireless communication according to the present disclosure.

The wireless communication unit 400 may intermittently transmit or receive a voice signal and an emergency signal on different frequency channels, which are generated by the voice and the accident sensing signal or transmitted from the outside.

For example, the wireless communication unit 400 may transmit or receive the voice signal on a first radio frequency channel, and intermittently transmit or receive the emergency signal on a second radio frequency channel.

The first radio frequency channel may use, for example, 448 MHz, and the second radio frequency channel may use, for example, 420 MHz.

The wireless communication unit 400 may repeatedly alternate between a Tx/Rx mode and a Tx/Rx standby mode according to time periods set by the controller 800.

FIG. 2 is a block diagram of the wireless communication unit illustrated in FIG. 1.

Referring to FIG. 2, the wireless communication unit 400 may include a Tx module 410 and an Rx module 420.

The Tx module 410 may transmit a voice signal and an emergency signal to the outside, which have been generated based on the voice and the accident sensing signal by the controller 800.

Particularly, when transmitting the emergency signal, the Tx module 410 may transmit the emergency signal or wait for transmission of the emergency signal by repeatedly alternating between the Tx mode and the Tx standby mode according to time periods set by the controller 800. The Rx module 420 may monitor reception of the voice signal and the emergency signal or wait for reception of the voice signal and the emergency signal by repeating one cycle of the Rx standby mode, a voice signal Rx mode, the Rx standby mode, and an emergency signal Rx mode according to time periods set by the controller 800.

(a) of FIG. 3 is a Tx timing diagram of the Tx module illustrated in FIG. 2, and (b) of FIG. 3 is an Rx timing diagram of the Rx module illustrated in FIG. 2.

Referring to (a) of FIG. 3, the Tx module 410 switches between the Tx mode and the Tx standby mode according to a Tx timing diagram preset by the controller 800.

In the Tx timing diagram, a Tx period $t_{TXB\_on}$ of the emergency signal and a Tx standby period $t_{TXB\_off}$ alternate with each other repeatedly. The Tx period $t_{TXB\_on}$ of the emergency signal and the Tx standby period $t_{TXB\_off}$ may be preset by the user. For example, the Tx period $t_{TXB\_on}$ of the emergency signal and the Tx standby period $t_{TXB\_off}$ may be set to 750 ms and 3000 ms, respectively.

According to the Tx timing diagram of the emergency signal, the Tx module 410 transmits the emergency signal during the Tx period $t_{TXB\_on}$ and waits for transmission of the emergency signal during the Tx standby period $t_{TXB\_off}$ under the control of the controller 800. Therefore, the Tx module 410 transmits the emergency signal intermittently.

Referring to (b) of FIG. 3, the Rx module 420 switches between the Rx mode and the Rx standby mode according to a Rx timing diagram preset by the controller 800.

In the Rx timing diagram, a voice signal Rx period $t_{RXp\_on}$, an Rx standby period $t_{RX\_off}$, an emergency signal Rx period $t_{RXB\_on}$, and the Rx standby period $t_{RX\_off}$ form one cycle (1T), and the cycle is repeated. The Rx standby period $t_{RX\_off}$, the voice signal Rx period $t_{RXp\_on}$, and the emergency signal Rx period $t_{RXB\_on}$ on may be set by the user. For example, the Rx standby period $t_{RX\_off}$ may be set to 300 ms, and each of the voice signal Rx period $t_{RXp\_on}$ and the emergency signal Rx period $t_{RXB\_on}$ may be set to 50 ms.

According to the Rx timing diagram, the Rx module 420 waits during the Rx standby period $t_{RX\_off}$, monitors reception of the voice signal during the voice Rx period $t_{RXp\_on}$, on waits during the Rx standby period $t_{RX\_off}$, and then monitors reception of the emergency signal during the emergency signal Rx period $t_{RXB\_on}$ under the control of the controller 800. Therefore, the Rx module 420 intermittently monitors reception of the voice signal and the emergency signal.

Meanwhile, upon sensing reception of the emergency signal for the emergency signal Rx period $t_{RXB\_on}$ during monitoring at the Rx module 420, the controller 800 may reset the emergency signal Rx period $t_{RXB\_on}$ by increasing it by about two or three times. The Rx module 420 may receive the emergency signal further during the reset emergency signal Rx period $t_{RXBD\_on}$.

Then, the controller 800 outputs a beep sound at a beep sound output interval set according to the Received Signal Strength Indicator (RSSI) of the received emergency signal during a beep generation period $t_{Beep}$ and controls the Rx module 420 to wait during the beep generation period $t_{Beep}$.

When the beep generation period $t_{Beep}$ elapses, the Rx module 420 repeats once cycle (1T) of the Rx standby mode, the voice signal Rx mode, the Rx standby mode, and the emergency signal Rx mode in this order under the control of the controller 800, thereby intermittently monitoring and receiving the voice signal and the emergency signal.

The reset emergency signal Rx period $t_{RXBD\_on}$ and the beep generation period $t_{Beep}$ may be set by the user. For example, the reset emergency signal Rx period $t_{RXBD\_on}$ may be set to 110 ms to 150 ms, and the beep generation period $t_{Beep}$ may be set to 1500 ms.

Referring to FIG. 1 again, the sound output unit 500 may output a voice and a beep sound corresponding to the voice signal and the emergency signal received from the outside. The beep sound may be output at an interval predetermined according to the RSSI of the received emergency signal. The sound output unit 500 may include, for example, a speaker and an earphone.

The power supply 600 supplies a driving power to the power-saving safety helmet 10 capable of wireless communication according to the embodiment of the present disclosure. The safety helmet 10 according to the embodiment of the present disclosure may periodically wake up the Tx module 410 and the Rx module 420 of the wireless communication unit 400 or make them sleep so that they may operate in the Tx/Rx mode and the Tx/Rx standby mode. Therefore, power consumption of the power supply 600 may be reduced. The power supply 600 may include, for example, a battery.

The memory 700 may pre-store Rx flags having different beep sound output intervals according to predetermined RSSIs. The controller 800 may select a beep sound output interval corresponding to an RSSI closest to the RSSI of an emergency signal received through the Rx module 420 by comparing the RSSI of the emergency signal with the predetermined emergency signal Rx flags.

For example, each of the predetermined emergency signal Rx flags may include a reception level, a distance (m) between a transmitter and a receiver, an RSSI (dBm), a beep sound output interval (ms), and a beep count.

TABLE 1

| Reception level | Distance (m) | RSSI (dBm) | Beep sound output interval (ms) | Beep count |
| --- | --- | --- | --- | --- |
| 1 | About 0 to 30 | −20 | 100 | 15 |
| 2 | About 31 to 60 | −35 | 136 | 11 |
| 3 | About 61 to 150 | −80 | 214 | 7 |
| 4 | About 151 to 300 | −70 | 500 | 3 |
| 5 | About 301 or more | −90 | 1500 | 1 |

Referring to [Table 1], it is noted that as the RSSI is larger, the beep sound output interval is shorter in the predetermined emergency signal Rx flags. This means that as the RSSI of an emergency signal received through the wireless communication unit 400 is larger, the beep sound output interval is shorter.

Further, as the beep sound output interval is shorter, more beep sounds are output during the beep generation period $t_{Beep}$. This means that the distance between a transmitting safety helmet and a receiving safety helmet is smaller.

Accordingly, it is possible for the user (rescuer) of the receiving safety helmet to estimate the position of the user (victim) of the transmitting safety helmet according to the beep sound output interval.

Meanwhile, the wireless communication unit 400 may further include a short-range communication module 430. The short-range communication module 430 may transmit and receive IP PTT signals.

For example, if the value of the accident sensing signal received from the sensor unit 300 is equal to or larger than a set value, the controller 800 may generate an IP PTT accident occurrence signal and control transmission of the IP PTT accident occurrence signal to the outside through the short-range communication module 430.

Upon receipt of an IP PTT accident occurrence signal from the outside through the short-range communication module 430, the controller 800 may control output of a pre-stored accident notification message through the sound output unit 500.

IP PTT communication through the short-range communication module 430 will be described in detail with reference to FIG. 11.

The controller 800 provides overall control to the power-saving safety helmet 10 capable of wireless communication according to the embodiment of the present disclosure.

FIG. 4 is a block diagram of the controller illustrated in FIG. 1. Referring to FIG. 4, the controller 800 may include a signal generation module 810, a frequency setting module 820, and a timer unit 830.

The signal generation module 810 may generate a voice signal by converting a voice received from the voice input unit 200 to an electrical signal. If the value of the accident sensing signal received from the sensor unit 300 is equal to or larger than a set value, the signal generation module 810 may generate an emergency signal. If the value of the accident sensing signal received from the sensor unit 300 is equal to or larger than the set value, the signal generation module 810 may also generate an IP PTT signal (for example, an IP PTT accident occurrence signal).

The frequency setting module 820 may set a frequency to a frequency channel of a corresponding operation during transmission and reception of the wireless communication unit 400.

For example, the frequency setting module 820 may set the wireless communication unit 400 to a first frequency channel during transmission and reception of the voice signal, and to a second frequency channel during transmission and reception of the emergency signal.

The timer unit 830 counts a predetermined time while a specific operation is performed during the predetermined time. The timer unit 830 may include a communication timer 831 and a system timer 832.

The communication timer 831 may count a Tx/Rx period and a Tx/Rx standby period during wake-up/sleep of the wireless communication unit 400 according to the Tx and Rx timing diagrams which have been set. For example, the communication timer 831 may be a 10-ms timer.

The system timer 832 may count a beep sound output interval according to the RSSI of the emergency signal, when a beep sound is output. For example, the system timer 832 may be a 1-ms timer.

Meanwhile, as stated before, the controller 800 may intermittently transmit or receive a voice signal and an emergency signal which have been generated according to a voice and an accident sensing signal or transmitted from the outside, by controlling the Tx module 410 and the Rx module 420 of the wireless communication unit 400.

For example, the controller 800 may transmit the voice signal by setting the Tx module 410 to the first frequency channel or transmit the emergency signal intermittently by setting the Tx module 410 to the second frequency channel.

Further, the controller 800 may control the Rx module 420 to repeat one cycle of the Rx standby mode, the voice signal Rx mode, the Rx standby mode, and the emergency signal Rx mode during a set time period.

Accordingly, in the case where the controller 800 repeatedly sets the Rx module 420 to the first and second frequency channels alternately, if the Rx module 420 is set to the first frequency channel, the controller 800 may control the Rx module 420 to monitor reception of the voice signal, and if the Rx module 420 is set to the second frequency channel, the controller 800 may control the Rx module 420 to monitor reception of the emergency signal.

After receiving the emergency signal, the controller 800 may control the sound output unit 500 to output a beep sound at an interval predetermined according to the RSSI of the received emergency signal.

The method for intermittently transmitting and receiving a voice signal and an emergency signal by controlling the wireless communication unit 400 by the controller 800 will be described in greater detail with reference to FIGS. 5 to 11.

FIG. 5 is a flowchart illustrating a wireless transmission method in the power-saving safety helmet capable of wireless communication according to an embodiment of the present disclosure, FIG. 6 is a flowchart illustrating a voice signal transmission method illustrated in FIG. 5, and FIG. 7 is a flowchart illustrating an emergency signal transmission method illustrated in FIG. 5.

Referring to FIG. 5, in the wireless transmission method of the power-saving safety helmet 10 capable of wireless communication according to the embodiment of the present disclosure, the controller 800 may determine whether a PTT signal has been received (S110) and whether an accident sensing signal has been received (S140).

First, the controller 800 determines whether a PTT signal has been received from the user (S110). If the PTT signal has not been received, the controller 800 determines whether an accident sensing signal generated from the sensor unit 300 has been received (S140). Although step S110 precedes step S140 in the present disclosure, step S140 may precede step S110.

Upon receipt of the PTT signal in step S110, the controller 800 wakes up the Tx module 410 of the wireless communication unit 400 and transmits a voice signal through the Tx module 410 (S120).

The controller 800 determines whether a PTT release signal has been received from the user during transmission of the voice signal through the Tx module 410 in step S120 (S130). Upon receipt of the PTT release signal, the controller 800 transitions the Tx module 410 of the wireless communication unit 400 to the Tx standby mode (S135).

On the other hand, if the PTT release signal has not been received in step S130, the controller 800 returns to step S110 and repeats the subsequent steps.

Meanwhile, upon receipt of the accident sensing signal in step S140, if the value of the accident sensing signal is equal to or larger than a set value, the controller 800 outputs an accident notification alarm through the sound output unit 500 (S145). On the contrary, if the accident sensing signal has not been received, the controller 800 returns to step S110 and repeats the subsequent steps.

Subsequently, if the accident notification alarm is output in step S145, the controller 800 determines whether an accident sensing release signal has been received from the user (S150). If the accident sensing release signal has not been received, the controller 800 determines whether a predetermined accident sensing release time has elapsed, using the timer unit 830 (S155). Upon receipt of the accident sensing release signal, the controller 800 returns to step S110 and repeats the subsequent steps.

Upon timeout of the accident sensing release time in step S155, the controller 800 wakes up the Tx module 410 and intermittently transmits an emergency signal through the Tx module 410 (S160). If the accident sensing release time has not elapsed, the controller 800 returns to step S145 and repeats the subsequent steps.

After step S160, the controller 800 determines whether an emergency Tx release signal has been received (S170). If the emergency Tx release signal has been received, the controller 800 transitions the Tx module 410 to the emergency signal Tx standby mode (S175).

Referring to FIG. 6, in step S120 for transmitting the voice signal, the controller 800 wakes up the Tx module 410 and sets the Tx module 410 to the first frequency channel (S121).

Then, the controller 800 receives a voice from the user (S122) and generates a voice signal by converting the voice to an electrical signal (S123).

Subsequently, the controller 800 transmits the voice signal on the first frequency channel (S124).

Referring to FIG. 7, in step S160 for intermittently transmitting the emergency signal, the controller 800 wakes up the Tx module 410 and sets the Tx module to the second frequency channel (S161).

Then, if the value of the accident sensing signal received from the sensor unit 300 is equal to or larger than the set value, the controller 800 generates the emergency signal (S162).

Subsequently, the controller 800 transmits the emergency signal on the second frequency channel (S163).

The controller 800 then determines whether the Tx period of the emergency signal has elapsed (S164). If the Tx period of the emergency signal has elapsed, the controller 800 discontinues transmission of the emergency signal and transitions the Tx module 410 to the Tx standby mode (S165).

If the Tx period of the emergency signal has not elapsed in step S164, the controller 800 returns to step S163 and continues transmitting the emergency signal.

After step S165, the controller 800 determines whether the standby period of the emergency signal has elapsed (S166).

If the standby period of the emergency signal has elapsed in step S166, the controller 800 determines whether a termination signal generated according to a user input by the key input unit 100 has been received (S167). If the standby period of the emergency signal has not elapsed, the controller 800 returns to step S165 and repeats the subsequent steps.

Upon receipt of the termination signal in step S167, the controller 800 ends the procedure. If the termination signal has not been received in step S167, the controller 800 returns to step S163 and repeats the subsequent steps in order to wake up the Tx module 410 and transmit the emergency signal through the Tx module 410.

Meanwhile, if the standby period of the Tx module 410 has not elapsed in step S166, the controller 800 returns to step S165 in which it waits for transmission.

FIG. 8 is a flowchart illustrating a wireless reception method in the power-saving safety helmet capable of wireless communication according to an embodiment of the present disclosure, FIG. 9 is a flowchart illustrating a voice signal reception method illustrated in FIG. 8, and FIG. 10 is a flowchart illustrating an emergency signal reception method illustrated in FIG. 8.

In the wireless reception method of the power-saving safety helmet 10 capable of wireless communication according to the embodiment of the present disclosure, the controller 800 may intermittently monitor reception of a voice signal and an emergency signal and receive the voice signal and the emergency signal by controlling the Rx module 420 of the wireless communication unit 400 to repeat one cycle of the Rx standby mode, the voice signal Rx mode, the Rx standby mode, and the emergency signal Rx mode according to time periods set by the controller 800.

In the voice signal Rx mode, the controller 800 may monitor the voice signal by setting the Rx module 420 to the first frequency channel, and in the emergency signal Rx mode, the controller 800 may monitor the emergency signal by setting the Rx module 420 to the second frequency channel.

Referring to FIG. 8, specifically, the controller 800 determines whether the standby period of the Rx module 420 has elapsed (S210). If the standby period of the Rx module 420 has not elapsed, the controller 800 operates the Rx module in the Rx standby mode during the standby period (S220).

If the standby period of the Rx module 420 has elapsed in step S210, the controller 800 determines whether the Rx period of the voice signal has elapsed (S230). If the Rx period of the voice signal has not elapsed, the controller 800 wakes up the Rx module 420 and monitors reception of the voice signal during the Rx period of the voice signal (S240).

If the Rx period of the voice signal has elapsed in step S230, the controller 800 determines whether the standby period of the Rx module 420 has elapsed (S250). If the standby period of the Rx module 420 has not elapsed in step S250, that is, during the standby period, the controller 800 makes the Rx module 420 sleep and operates the Rx module 420 in the Rx standby mode (S260).

If the standby period of the Rx module 420 has elapsed in step S250, the controller 800 determines whether the Rx period of the Rx module 420 has elapsed (S270). If the Rx period of the voice signal has not elapsed, that is, during the Rx period, the controller 800 wakes up the Rx module 420 and monitors reception of the emergency signal (S280).

If the Rx period of the Rx module 420 has elapsed in step S270, the controller 800 determines whether a termination signal generated according to a user input by the key input unit 100 has been received (S275).

Upon receipt of the termination signal in step S275, the controller 800 ends the procedure. If the termination signal has not been received, the controller 800 makes the Rx module 420 sleep and operates the Rx module in the Rx standby mode. Then, the controller 800 returns to step S210 and repeats the subsequent steps.

Referring to FIG. 9, in step S240 for monitoring reception of the voice signal, the controller 800 wakes up the Rx module 420 and sets the Rx module 420 to the first frequency channel (S241).

Then, the controller 800 determines whether reception of the voice signal from the outside has been sensed (S242).

Upon sensing reception of the voice signal from the outside in step S242, the controller 800 extracts a voice from the received voice signal (S243), low-noise-amplifies the voice (S245), and outputs the voice through the sound output unit 500 (S246).

If reception of the voice signal has not been sensed in step S242, the controller 800 monitors reception of the voice signal during the set Rx period.

Referring to FIG. 10, in step S280 for monitoring reception of the emergency signal, the controller 800 wakes up the Rx module 420 and sets the Rx module 420 to the second radio frequency channel (S281).

Then, the controller 800 determines whether reception of an emergency signal from the outside has been sensed (S282).

Upon sensing reception of the emergency signal from the outside in step S282, the controller 800 extracts the emergency signal (S284) and detects the RSSI of the extracted emergency signal (S285).

Subsequently, the controller 800 compares the detected RSSI of the emergency signal with pre-stored Rx flags including beep sound output intervals according to RSSIs, and selects a beep sound output interval corresponding to an RSSI closest to the detected RSSI (S291).

Then, the controller 800 outputs a beep sound at the selected beep sound output interval through the sound output unit 500 during a beep generation period (S293).

If reception of the emergency signal from the outside has not been sensed in step S282, the controller 800 continues monitoring reception of the emergency signal during the set Rx period.

Step S280 for monitoring reception of the emergency signal may further include resetting the set Rx period so that the Rx period may be increased, upon sensing reception of the emergency signal from the outside in step S282.

In other words, the controller 800 determines whether the reset Rx period has elapsed (S283). If the reset Rx period has not elapsed, the controller 800 continues receiving the emergency signal. If the period Rx interval has elapsed, the controller 800 discontinues reception of the emergency signal by making the Rx module 420 sleep, and transition the Rx module 420 to the Rx standby mode (S295).

Then, the controller 800 determines whether the beep generation period has elapsed (S296). If the beep generation period has not elapsed, the controller 800 continues operating the Rx module 420 in the Rx standby mode. If the beep generation period has elapsed, the controller 800 may return to step S210 and repeat the subsequent steps.

Further, the controller 800 detects the RSSI of the emergency signal extracted in step S285. If the Signal-to-Noise Ratio (SNR) and Squelch (SQ) of the emergency signal are smaller than set values, the controller 800 stores the RSSI of the emergency signal, determining that the emergency signal is valid (S287). Then, the controller 800 may calculate the average of RSSIs stored through repetition of this operation (S288 and S289), and determine the calculated average to be a valid RSSI (S290). Specifically, the controller 800 increases a variable indicating the count of storing RSSIs of detected emergency signals, n by 1 (S288) and determines whether the count is larger than a set number (S289). The controller 800 may repeat steps S288 and S289 until the count n is larger than the set number.

Subsequently, the controller 800 compares the determined valid RSSI with Rx flags including beep sound output intervals for the pre-stored RSSIs, and selects a beep sound output interval corresponding to an RSSI closest to the determined valid RSSI (S291).

The controller 800 outputs a beep sound at the selected beep sound output interval through the sound output unit 500 during the beep generation period (S293).

Meanwhile, the power-saving safety helmet 10 capable of wireless communication according to the embodiment of the present disclosure may conduct IP PTT communication using the short-range communication module 430.

FIG. 11 is a view illustrating a configuration of an IP PTT communication network using the power-saving safety helmet capable of wireless communication according to an embodiment of the present disclosure.

Referring to FIG. 11, the IP PTT communication network using the power-saving safety helmet 10 capable of wireless communication according to the embodiment of the present disclosure may include a safety helmet group of a plurality of safety helmets 10 and 20, a terminal group of a plurality of terminals 11 and 21 interacting with the safety helmets 10 and 20, and an IP PTT server 50 associated with the terminal group.

The plurality of safety helmets 10 and 20 of the safety helmet group are associated with each other, and the plurality of terminals 11 and 21 of the terminal group are associated with each other.

The plurality of terminals 11 and 21 of the terminal group may include terminals equipped with an IP PTT function (for example, smartphones).

IP PTT communication may be conducted through the short-range communication module 430 of the safety helmet 10 as follows. For the convenience of description, a transmitting safety helmet and receiving safety helmets are distinguished from each other by reference numerals 10 and 20, respectively. Likewise, a transmitting terminal interacting with the transmitting safety helmet 10 and receiving terminals interacting with the receiving safety helmets 20 are also distinguished from each other by reference numerals 11 and 21, respectively.

In the transmitting safety helmet 10, if the value of an accident sensing signal received from the sensor unit 300 is equal to or larger than a predetermined value, the controller 800 may generate an IP PTT accident occurrence signal and transmit the IP PTT accident occurrence signal to the transmitting terminal 11 interacting with the transmitting safety helmet 10 through the short-range communication module 430.

The transmitting terminal 11 generates an IP PTT accident occurrence packet based on the IP PTT accident occurrence signal received from the short-range communication module 430, and transmits the IP PTT accident occurrence packet to the IP PTT server 50. The transmitting terminal 11 is connected to the IP PTT server 50 via a mobile communication network 30, and the mobile communication network 30 interacts with a Packet Switched (PS) network 40.

The IP PTT server 50 forwards the received IP PTT accident occurrence packet to each of the receiving terminals 21 associated with the transmitting terminal 11.

Each of the receiving terminals 21 may convert the received IP PTT accident occurrence packet to video and audio data and output the video and audio data. For example, the video data may display user information and position information about the transmitting safety helmet 10 (of a victim) on a display of the receiving terminal 21, and the audio data may be an accident notification message output through a sound output unit of the receiving terminal 21.

Further, the plurality of receiving terminals 21 may transmit IP PTT accident occurrence signals to the plurality of receiving safety helmets 20 (of rescuers) interacting with the receiving terminals 21.

Each of the receiving safety helmets 20 may receive the IP PTT accident occurrence signal and output a pre-stored IP PTT accident notification message through the sound output unit 500.

The user (rescuer) of the receiving safety helmet 20 may determine the position of the user of the transmitting safety helmet 10 (the victim) through the associated terminal 21.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive.

The invention claimed is:

1. A power-saving safety helmet capable of wireless communication, comprising;
  a voice input unit for receiving a voice from a user;
  a sensor unit for generating an accident sensing signal by sensing whether an accident has occurred to the user;
  a wireless communication unit for intermittently transmitting or receiving a voice signal and an emergency signal on different frequency channels, the voice signal and the emergency signal being generated based on the voice and the accident sensing signal or transmitted from the outside;
  a sound output unit for outputting a voice and a beep sound corresponding to the voice signal and the emergency signal received from the outside; and
  a controller for controlling output of the beep sound at an output interval set according to a reception strength of the received emergency signal
  wherein the wireless communication unit comprises:
  a transmission module for transmitting the emergency signal or waiting by repeatedly alternating between a transmission mode and a standby mode according to set time periods; and
  a reception module for monitoring reception of the emergency signal or waiting by repeating one cycle of a standby mode, a voice signal reception mode, the standby mode, and an emergency signal reception mode according to set time periods,
  wherein if the controller senses reception of the emergency signal through the reception module, the controller resets a set time period to be longer and controls reception of the emergency signal during the reset time period and if a Signal-to-Noise Ratio (SNR) and Squelch (SQ) of the emergency signal are smaller than set values, the controller determines that the emergency signal is valid, and determines a reception strength of the emergency signal to be a valid reception strength.

2. The power-saving safety helmet according claim 1, wherein if a value of the accident sensing signal received from the sensor unit is equal to or larger than a set value, the controller generates the emergency signal, controls the transmission module to intermittently transmit the emergency signal, and controls the reception module to monitor and receive only the voice signal from the outside.

3. The power-saving safety helmet according to claim 2, the controller receives a predetermined number of valid emergency signals, stores reception strengths of the valid emergency signals, and determines an average of the stored reception strengths to be the valid reception strength.

4. The power-saving safety helmet according to claim 3, wherein the controller compares the determined valid reception strength with beep sound output intervals set for predetermined reception strengths, selects a beep sound output interval corresponding to a reception strength closest to the determined valid reception strength, and controls output of the beep sound at the selected beep sound output interval through the sound output unit.

5. The power-saving safety helmet according to claim 1, wherein the wireless communication unit further comprises a short-range communication module for transmitting or receiving an Internet Protocol (IP) Push-To-Talk (PTT) signal.

6. The power-saving safety helmet according to claim 5, wherein if a value of the accident sensing signal received from the controller is equal to or larger than a set value, the controller generates an IP PTT accident occurrence signal and transmits the IP PTT accident occurrence signal through the short-range communication module, and if an IP PTT accident occurrence signal is received from the outside through the short-range communication module, the controller controls output of a pre-stored accident notification message through the sound output unit.

7. The power-saving safety helmet according to claim 5, wherein the short-range communication module conforms to one of Bluetooth, Zigbee, Wireless Fidelity (WiFi) Access Point (AP), and Near Field Communication (NFC).

8. A wireless transmission method in a power-saving safety helmet capable of wireless communication, the method comprising:
  determining whether a Push-To-Talk (PTT) signal or an accident sensing signal has been received by a controller;
  upon receipt of the PTT signal, receiving a voice, generating a voice signal, and transmitting the voice signal on a first frequency channel by the controller; and
  upon receipt of the accident sensing signal, generating an emergency signal and intermittently transmitting the emergency signal on a second frequency channel by the controller,
  wherein the transmission of the emergency signal comprises:
  comparing a value of the accident sensing signal with a set value, and if the value of the accident sensing signal is equal to or larger than the set value, generating the emergency signal, by the controller;
  setting a transmission module of a wireless communication unit to the second frequency channel by the controller; and
  intermittently transmitting the emergency signal through the transmission module by repeatedly operating the transmission module alternately in a transmission mode and a standby mode according to set transmission and standby periods by the controller.

9. The wireless transmission method according to claim 8, further comprising:
  upon receipt of a PTT release signal after transmitting the voice signal, discontinuing transmission of the voice signal by the controller; and
  upon receipt of the PTT release signal after transmitting the emergency signal, discontinuing transmission of the emergency signal by the controller.

10. The wireless transmission method according to claim 8, further comprising, if a value of the accident sensing signal is equal to or larger than a set value, generating an Internet Protocol (IP) PTT accident occurrence signal and transmitting the IP PTT accident occurrence signal to the outside through a short-range communication module of the wireless communication unit by the controller.

11. A wireless reception method in a power-saving safety helmet capable of wireless communication, the method comprising:
   intermittently monitoring reception of a voice signal and an emergency signal by repeating one cycle of a standby mode, a voice signal reception mode, the standby mode, and an emergency signal reception mode through a reception module of a wireless communication unit according to set time periods by a controller;
   monitoring the voice signal by setting the reception module to a first frequency channel in the voice signal reception mode by the controller; and
   monitoring the emergency signal by setting the reception module to a second frequency channel in the emergency signal reception mode by the controller.

12. The wireless reception method according to claim 11, further comprising:
   if the emergency signal is sensed during the monitoring, detecting a reception strength of the emergency signal by the controller;
   selecting a beep sound output interval corresponding to a reception strength closest to the detected reception strength by comparing the detected reception strength with beep sound output intervals for predetermined reception strengths by the controller; and
   outputting a beep sound at the selected beep sound output interval through a sound output unit by the controller.

13. The wireless reception method according to claim 11, further comprising, if the emergency signal is sensed during the monitoring, resetting a set time period to be longer.

14. The wireless reception method according to claim 13, further comprising, during the reset time period:
   if a Signal-to-Noise Ratio (SNR) and a squelch (SQ) of the received emergency signal are smaller than set values, determining that the emergency signal is valid by the controller;
   receiving a set number of valid emergency signals and storing reception strengths of the valid emergency signals;
   calculating an average of the set number of stored reception strengths and determining the average to be a valid reception strength by the controller;
   selecting a beep sound output interval corresponding to a reception strength closest to the determined valid reception strength by comparing the determined valid reception strength with beep sound output intervals for predetermined reception strengths by the controller; and
   outputting a beep sound at the selected beep sound output interval through a sound output unit by the controller.

15. The wireless reception method according to claim 11, further comprising:
   receiving an Internet Protocol (IP) Push-To-Talk (PTT) accident occurrence signal from the outside through a short-range communication module of the wireless communication unit; and
   receiving the IP PTT accident occurrence signal and outputting an accident notification message through a sound output unit by the controller.

* * * * *